(12) United States Patent
Joshi et al.

(10) Patent No.: US 10,346,320 B2
(45) Date of Patent: Jul. 9, 2019

(54) RESTRICTING APPLICATIONS AND USERS THAT CAN MAKE PERSISTENT CHANGES TO ARTIFACTS

(71) Applicant: Wyse Technology L.L.C., Santa Clara, CA (US)

(72) Inventors: Salil S Joshi, Fremont, CA (US); Puneet Kaushik, Fremont, CA (US)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 279 days.

(21) Appl. No.: 15/418,011

(22) Filed: Jan. 27, 2017

(65) Prior Publication Data

US 2018/0217946 A1 Aug. 2, 2018

(51) Int. Cl.
*G06F 16/00* (2019.01)
*G06F 12/14* (2006.01)
*G06F 21/00* (2013.01)

(52) U.S. Cl.
CPC ...... *G06F 12/1458* (2013.01); *G06F 12/1433* (2013.01); *G06F 21/00* (2013.01); *G06F 2212/1052* (2013.01)

(58) Field of Classification Search
CPC ......... G06F 17/30377; G06F 17/30082; G06F 17/30115; G06F 8/65; G06F 3/0644; G06F 3/0604; G06F 3/0653; G06F 3/0647; G06F 3/0673; G06F 3/065; G06F 3/0674; G06F 3/0665; G06F 3/0619; G06F 12/1458; G06F 2212/105; G06F 2212/69; G06F 11/3644; G06F 12/128; G06F 12/0875; G06F 21/00; G06F 12/1433; G06F 2121/1052; G06F 16/00; G06F 17/30; G16H 10/60
See application file for complete search history.

(56) References Cited

U.S. PATENT DOCUMENTS

| | | | |
|---|---|---|---|
| 2005/0149726 A1* | 7/2005 | Joshi | G06F 21/51 713/164 |
| 2005/0185789 A1* | 8/2005 | Goodwin | G06F 21/80 380/1 |
| 2005/0235106 A1* | 10/2005 | Kimura | G06F 12/0888 711/112 |
| 2006/0026684 A1* | 2/2006 | Harvey | G06F 21/53 726/23 |
| 2007/0094471 A1* | 4/2007 | Shaath | G06F 12/1466 711/163 |
| 2007/0101079 A1* | 5/2007 | Macintyre | G06F 12/0804 711/163 |

(Continued)

*Primary Examiner* — Anh Ly
(74) *Attorney, Agent, or Firm* — Kirton McConkie; Brian Tucker

(57) ABSTRACT

Applications and users can be restricted from making persistent changes to artifacts on a protected volume. In Windows-based systems that include a file-based write filter, a policy-based write filter can be positioned below the file-based write filter and can examine any write requests that target artifacts of a protected volume and are not redirected by the file-based write filter. The policy-based write filter can examine the write requests against any applicable policies to determine whether the write requests should be allowed to proceed. If the policy-based write filter determines that a write request is not allowed by policy, it can fail the write request to thereby prevent the targeted artifact from being updated in the protected volume.

20 Claims, 15 Drawing Sheets

(56) References Cited

U.S. PATENT DOCUMENTS

| | | | |
|---|---|---|---|
| 2007/0186070 A1* | 8/2007 | Federa | G06F 12/1425 711/163 |
| 2009/0164738 A1* | 6/2009 | Erfani | G06F 12/0888 711/142 |
| 2010/0043072 A1* | 2/2010 | Rothwell | G06F 21/566 726/24 |
| 2010/0125588 A1* | 5/2010 | Mehra | G06F 16/162 707/754 |
| 2011/0088027 A1* | 4/2011 | Jelvis | G06F 9/4411 717/174 |
| 2012/0197972 A1* | 8/2012 | Tukol | G06F 9/44505 709/203 |
| 2012/0311263 A1* | 12/2012 | Kamath | G06F 3/0622 711/118 |
| 2013/0097655 A1* | 4/2013 | Vaidyanathan | G06F 21/55 726/1 |
| 2013/0138718 A1* | 5/2013 | Mallur | G06F 8/61 709/203 |
| 2013/0139183 A1* | 5/2013 | Mallur | G06F 8/63 719/321 |
| 2013/0173744 A1* | 7/2013 | Xinglong | G06F 3/0617 709/217 |
| 2013/0198474 A1* | 8/2013 | Shaath | G06F 12/1466 711/163 |
| 2014/0245454 A1* | 8/2014 | Lee | G06F 21/62 726/26 |

\* cited by examiner

700

701
Load A Policy-based Write Filter In A Device Stack Corresponding To A Protected Volume, The Policy-based Write Filter Being Loaded Below A File-based Write Filter, The Policy-based Write Filter Being Associated With Policies That Define Whether Artifacts On The Protected Volume Should Be Allowed To Be Modified

702
Receive, At The Policy-based Write Filter, A First Request To Modify A First Artifact On The Protected Volume

703
Evaluate The First Request Against The Policies To Determine That The Policies Do Not Permit The First Artifact To Be Modified By The First Request

704
Prevent The First Request From Modifying The First Artifact

*FIG. 7*

RESTRICTING APPLICATIONS AND USERS THAT CAN MAKE PERSISTENT CHANGES TO ARTIFACTS

CROSS-REFERENCE TO RELATED APPLICATIONS

N/A

BACKGROUND

The Windows Embedded operating system includes functionality that can prevent the content of a storage medium from being changed. In a typical example, it may be desirable to prevent the operating system image, which may be stored on a particular disk partition or on flash media, from being changed at runtime. To accomplish this, Windows Embedded provides a file-based write filter which operates at the file level and a block-based write filter (or enhanced write filter) that operates at the block level to redirect all writes that target a protected volume to a RAM or disk cache called an overlay. This overlay stores changes made to the operating system at runtime but is removed when the device is restarted thereby restoring the device to its original state.

FIG. 1 illustrates how a file-based write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, file-based write filter 110 is positioned at the top of the driver stack and will therefore be able to process an IRP prior to the IRP being passed down to the lower level drivers. File-based write filter 110 can be configured to detect writes targeting a protected volume and redirect them to overlay 140 rather than allowing them to be passed down the driver stack. As a result, the write will actually occur in overlay 140 rather than to disk 100. File-based write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

Even when file based write filter 110 is employed, it may still be desirable to allow certain files to be modified on disk 100. To enable this, file-based write filter 110 includes an exclusion list which identifies any file or directory that file-based write filter 110 should allow to be modified. An application can add a file or directory to this exclusion list using write filter APIs 150. For example, the FbwfAddExclusion function allows an application to specify a file or directory to be excluded. When file-based write filter 110 receives a write request that targets a file or directory that is included in the exclusion list, it will allow the write request to proceed down the driver stack in a normal fashion such that the write will occur on disk 100. Similarly, even if a file has been redirected to overlay 140, an application may employ the FbwfCommitFile function to cause the file in overlay 140 to be persisted to disk 100. The ability to add files and directories to the exclusion list as well as the ability to commit files in the overlay to disk creates a backdoor that can be exploited by malicious code.

BRIEF SUMMARY

The present invention extends to methods, systems, and computer program products for restricting applications and users that can make persistent changes to artifacts on a protected volume. In Windows-based systems that include a file-based write filter, a policy-based write filter can be positioned below the file-based write filter and can examine any write requests that target artifacts of a protected volume and are not redirected by the file-based write filter. The policy-based write filter can examine the write requests against any applicable policies to determine whether the write requests should be allowed to proceed. If the policy-based write filter determines that a write request is not allowed by policy, it can fail the write request to thereby prevent the targeted artifact from being updated in the protected volume.

In one embodiment, the present invention is implemented as a method for preventing an artifact on a protected volume from being modified. A policy-based write filter can be loaded below a file-based write filter in a device stack corresponding to a protected volume. The policy-based write filter can be associated with policies that define whether artifacts on the protected volume should be allowed to be modified. The policy-based write filter can receive a first request to modify a first artifact on the protected volume and evaluate it against the policies to determine that the policies do not permit the first artifact to be modified by the first request. In response, the policy-based write filter can prevent the first request from modifying the first artifact.

In another embodiment, the present invention is implemented as computer storage media storing computer-executable instructions which when executed implement a policy-based write filter that is configured to be loaded in a device stack corresponding to a protected volume. The policy-based write filter can be further configured to: receive requests to modify artifacts on the protected volume after the requests have been evaluated by a file-based write filter; evaluate the requests against policies; and, for each request, either block or allow the request based on the evaluation.

In another embodiment, the present invention is implemented as a method for augmenting protection of a volume. A policy-based write filter can be loaded under a file-based write filter in a device stack pertaining to the volume. For any IRP that represents a modification to an artifact on the volume and that the file-based write filter evaluated and did not redirect to an overlay, the policy-based write filter can evaluate the IRP against policies such that when the policies indicate that the artifact is allowed to be modified, the policy-based write filter allows the IRP to be passed down the device stack, whereas, when the policies indicate that the artifact is not allowed to be modified, the policy-based write filter fails the IRP.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 7 provides a flowchart of an example method for preventing an artifact on a protected volume from being modified.

DETAILED DESCRIPTION

In this specification, the term "artifact" should be construed as encompassing files, directories, registry entries, or any other structure of a file system that can be modified via an I/O request. A "file-based write filter" should be construed as the File-based Write Filter (FBWF) that is included in the Windows Embedded operating system, any equivalent write filter that may be provided in future releases of Windows, or any write filter that performs equivalent functionality in other operating systems (i.e., redirecting writes targeting a protected volume to a separate, and possibly temporary, storage location). A "protected volume" should be construed as a volume storing artifacts that a file-based write filter protects from modification. A "write request" should be construed as any type of request that, if completed, will result in modification of an artifact and should therefore include requests to write to files as well as requests to create files.

Figure 1:
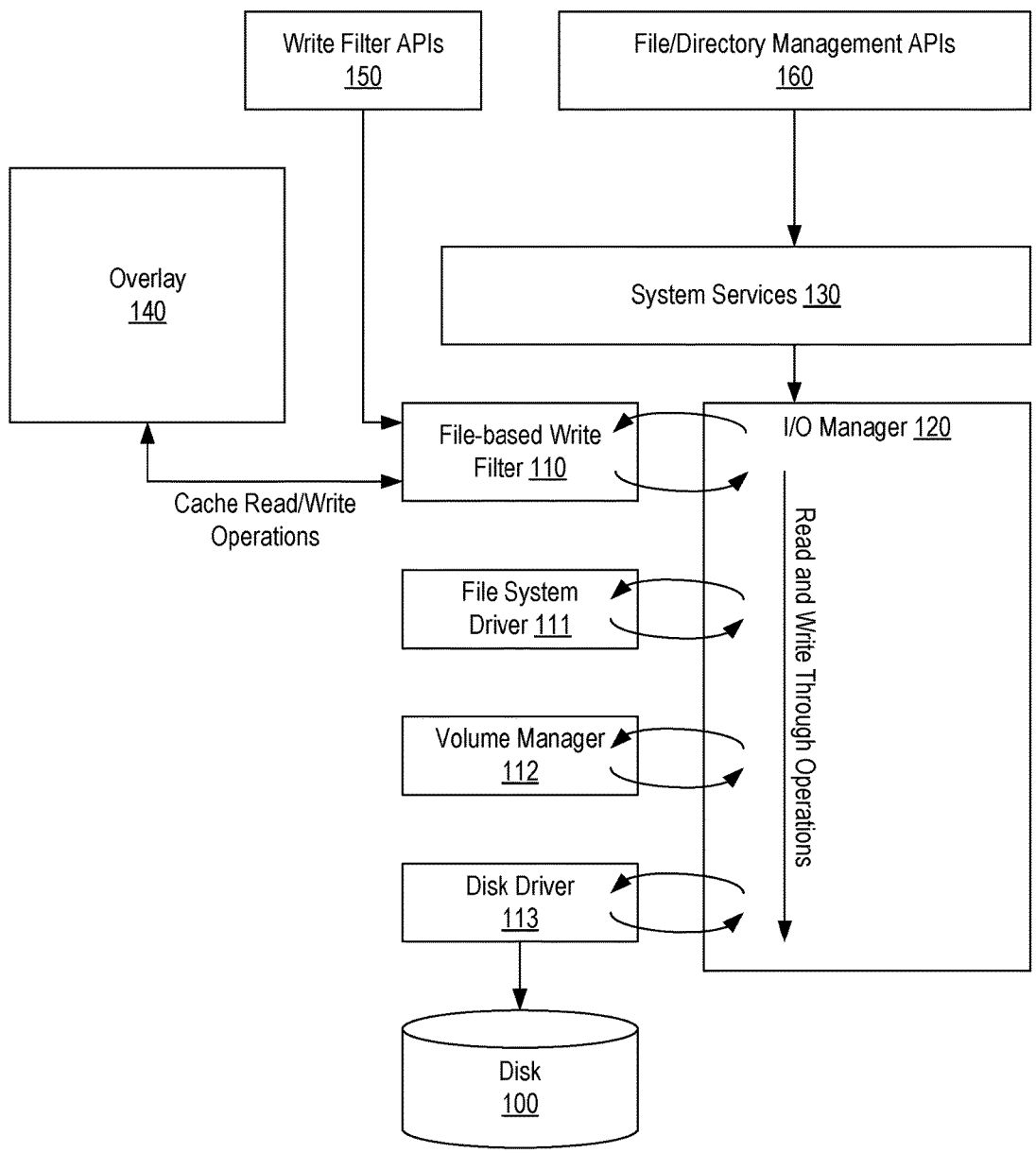
FIG. 1 illustrates a Windows-based I/O system in which a file-based write filter is employed to redirect writes targeting a protected volume to an overlay.
Figure 2:
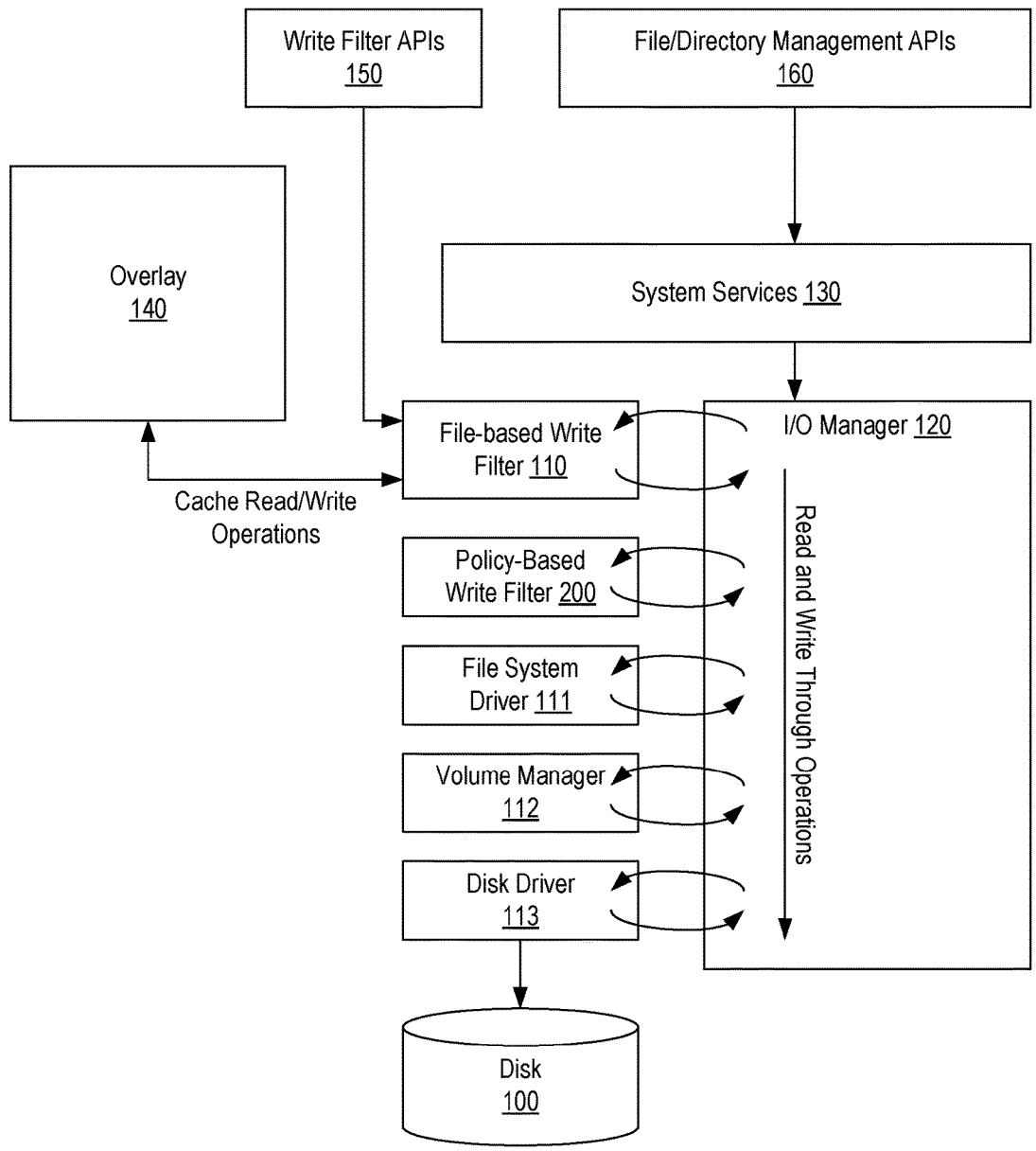
FIG. 2 illustrates how a policy-based write filter can be incorporated in the Windows-based I/O system to provide additional security to artifacts on a protected volume.

FIG. 2 is based on FIG. 1 and illustrates how a policy-based write filter can be used in conjunction with a file-based write filter to enhance the protection of artifacts on a protected volume. As shown, the same components that were included in FIG. 1 are also included in FIG. 2. Additionally, a policy-based write filter 200 is positioned below file-based write filter 110 in the stack. Accordingly, the present invention can be implemented within the standard Windows Embedded I/O architecture.

Figure 3:
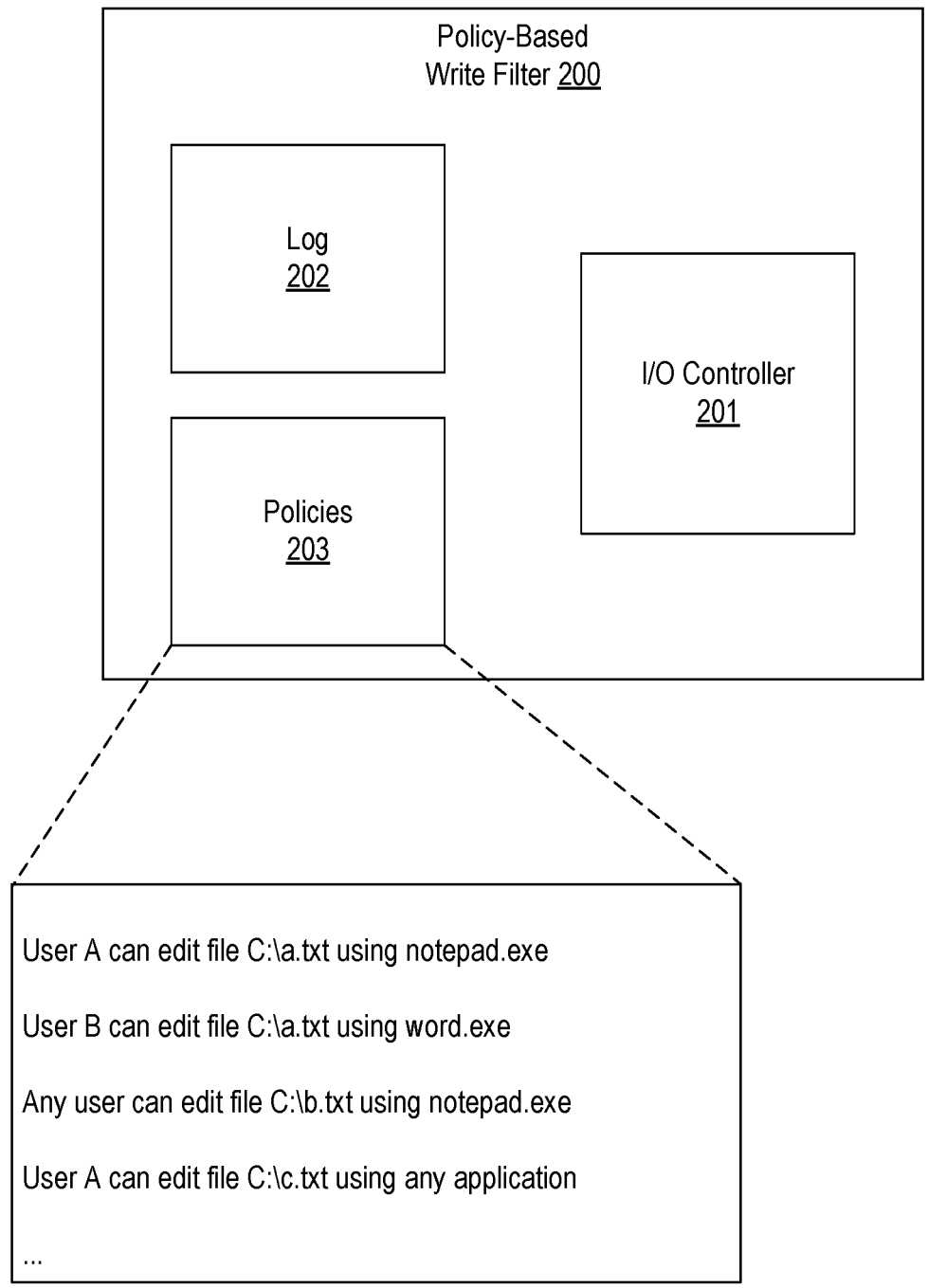
FIG. 3 provides a more detailed example of the policy-based write filter including various example policies.

FIG. 3 provides a more detailed view of the components of policy-based write filter 200. These components include I/O controller 201, log 202, and policies 203. I/O controller 201 represents the portions of policy-based write filter 200 that implement a filter driver. Therefore, I/O controller 201 can include functionality for receiving IRPs from I/O manager 120. I/O controller 201 can process IRPs in accordance with policies 203 and can update log 202 to reflect this processing as will be further described below.

Policies 203 can define which users can use which applications to modify a particular artifact. For example, FIG. 3 includes policies of "User A can edit file C:\a.txt using notepad.exe," "User B can edit file C:\a.txt using word.exe," "Any user can edit file C:\b.txt using notepad.exe," and "User A can edit file C:\c.txt using any application." Policies 203 can be configured in a number of different ways such as, for example, via ini files, whitelists, hardcoding into a client-side agent, network sources, etc.

Policies 203 can be stored and/or obtained by policy-based write filter 200 in a number of different manners. For example, policies 203 could be hard-coded into policy-based write filter 200. Alternatively, policy-based write filter 200 may be configured to communicate with another component (e.g., a user mode component) during initialization or runtime to obtain and/or evaluate policies 203. In some embodiments, this other component may be configured to communicate with a remote service (e.g., a management server) to obtain and update policies 203. Accordingly, the manner in which policies 203 are stored and accessed by policy-based write filter 200 is not essential to the present invention.

Figure 4A:
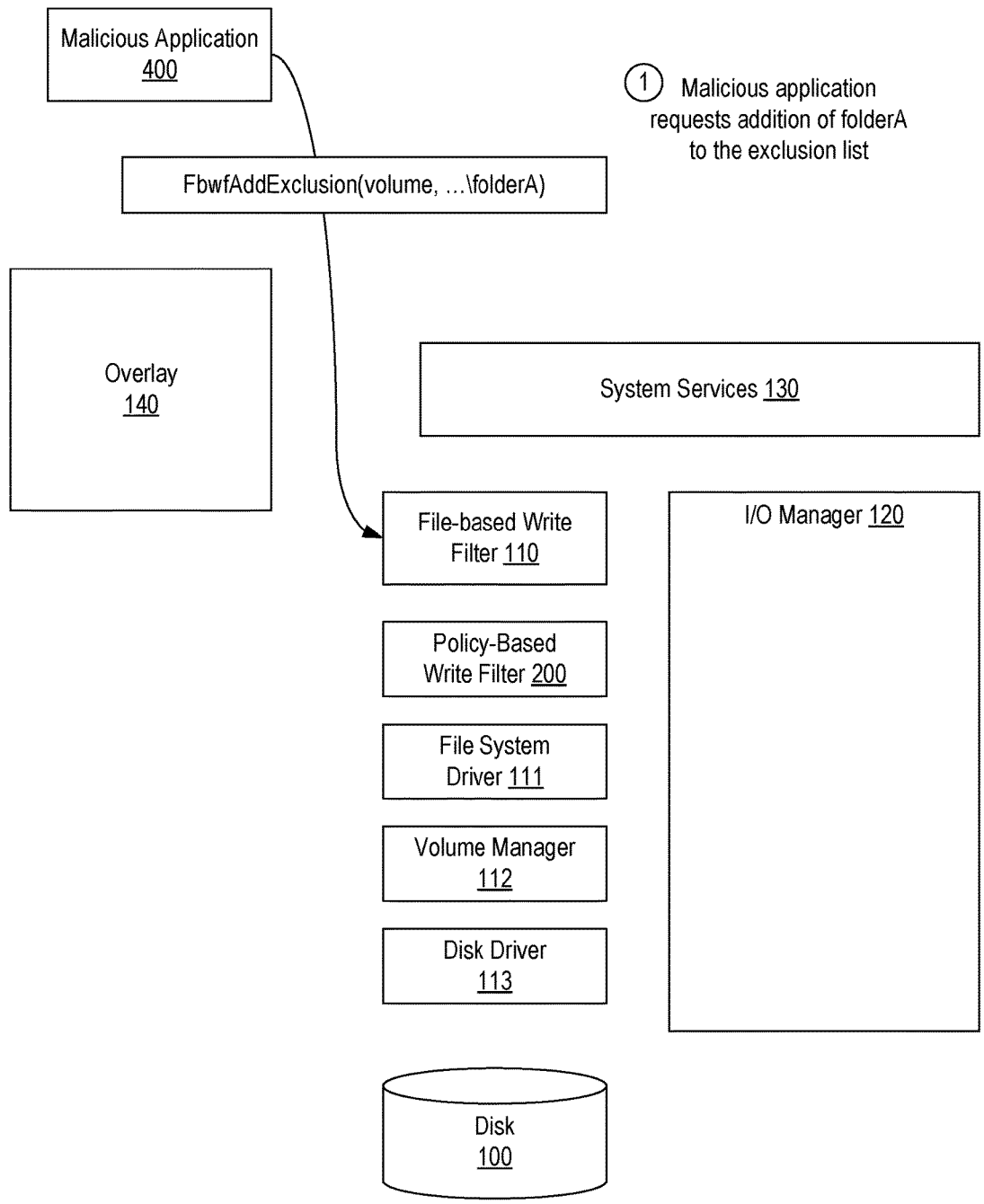
FIGS. 4A-4F illustrate how the policy-based write filter can prevent modification of an artifact on a protected volume even when the file-based write filter does not prevent the modification.

FIGS. 4A-4F provide an example of how policy-based write filter 200 can block a write request even when file-based write filter 110 would allow the write request to modify an artifact on disk 100. In FIG. 4A, it will be assumed that in step 1 a malicious application 400 employs the FbwfAddExclusion( ) function of write filter APIs 150 to add an exclusion for the contents of a folder named FolderA. This is just one example of how an exclusion can be added to the exclusion list. In some cases, an exclusion may be added by a legitimate application for a legitimate purpose which could then be exploited by a malicious application.

Figure 4B:
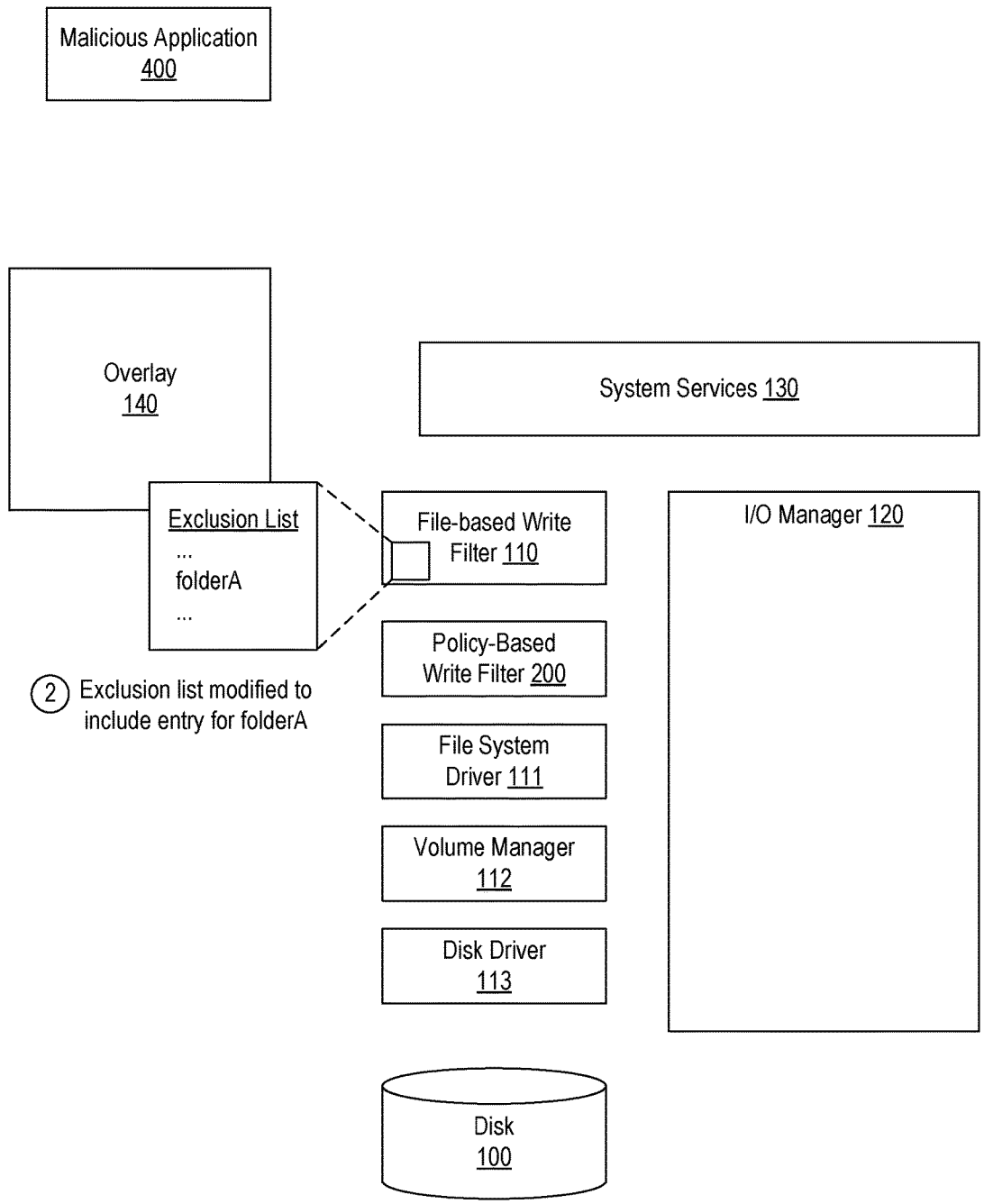
Figure 4C:
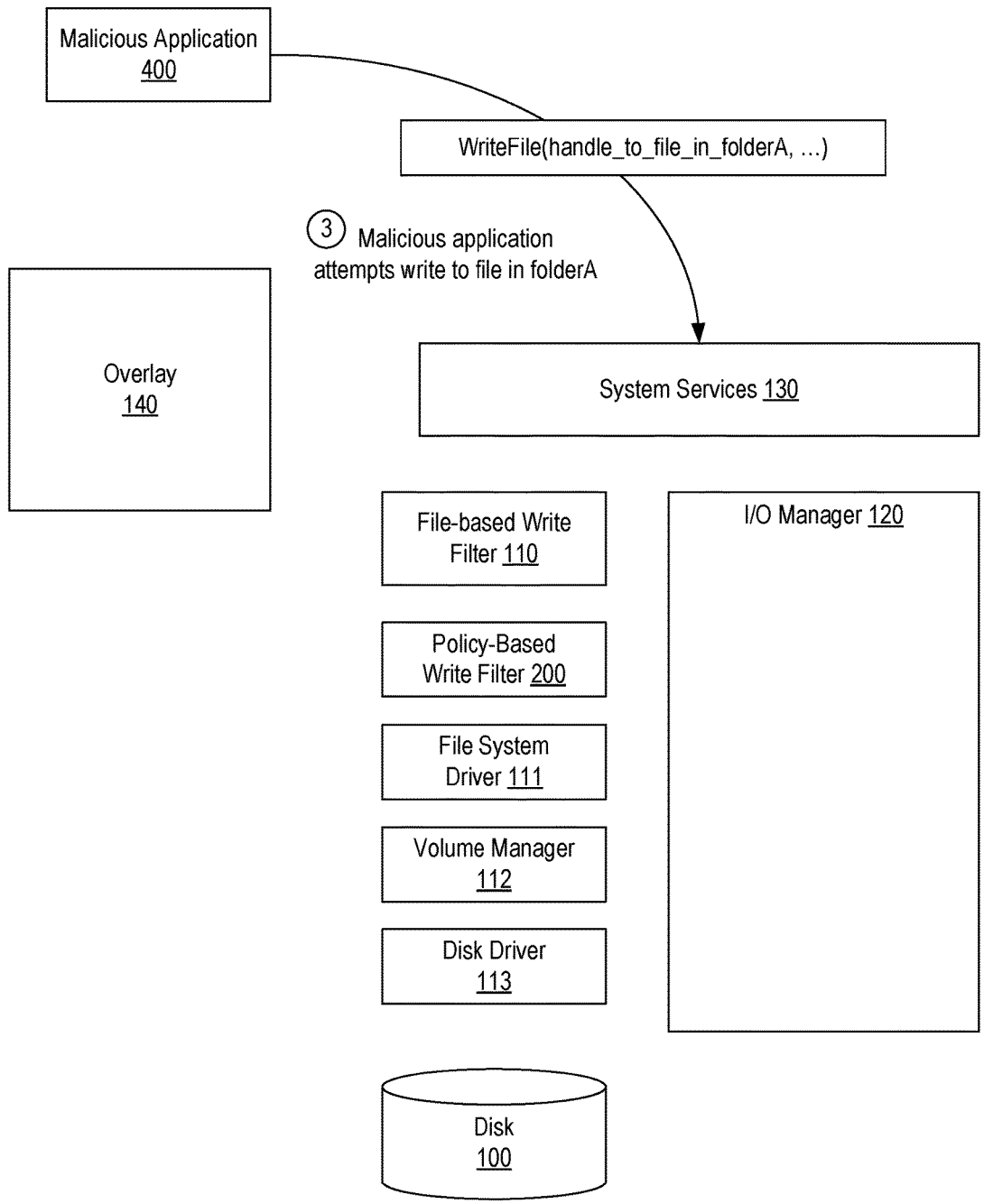

As a result of this call to the FbwfAddExclusion( ) function, FIG. 4B shows that an exclusion for folderA has been added to the exclusion list in step 2. As a result, any I/O request that attempts to modify the contents of folderA will no longer be redirected to overlay 140. For example, in step 3 shown in FIG. 4C, malicious application 400 is shown as attempting to write to a file in folderA (e.g., by using the WriteFile function of file/directory management APIs 160). I/O manager 120, in conjunction with system services 130, will create an IRP for this write request (e.g., as an IRP with a major function code of IRP_MJ_WRITE) and pass the IRP down the driver stack. Assuming file-based write filter 110 is the topmost driver in the stack, it will receive and process the IRP first. This processing will include determining whether to redirect the write request to overlay 140.

Figure 4D:
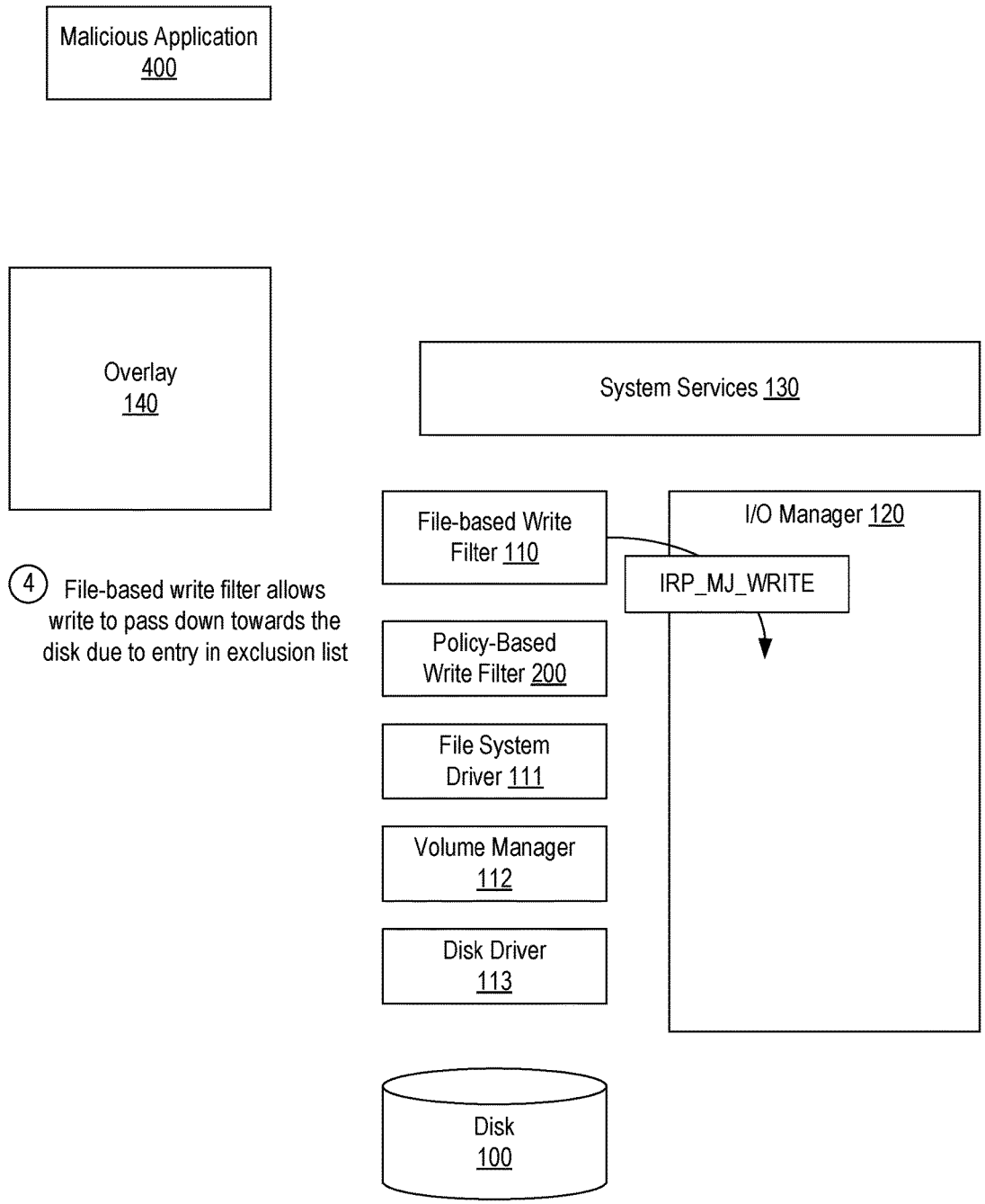
Figure 4E:
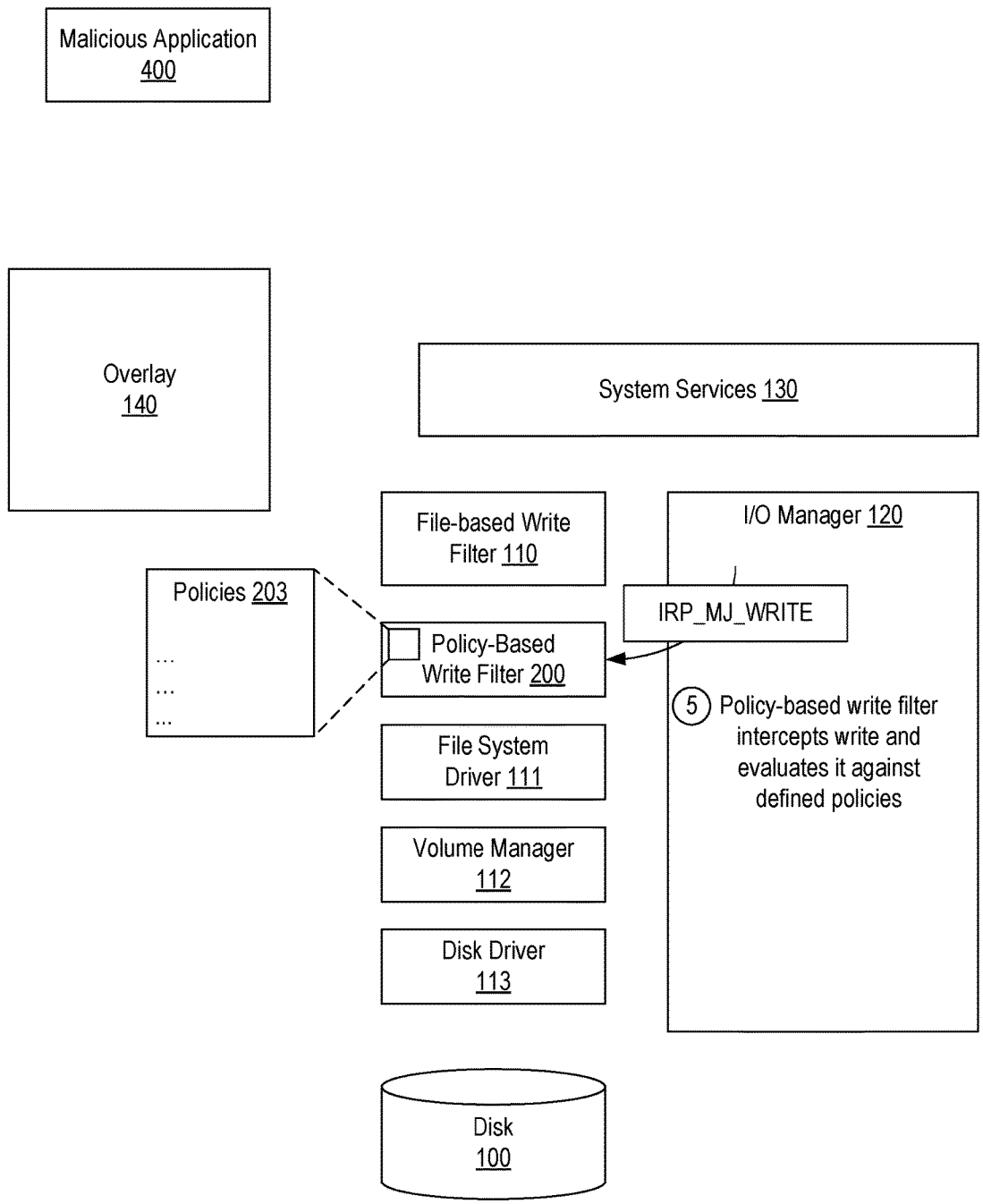
Figure 4F:
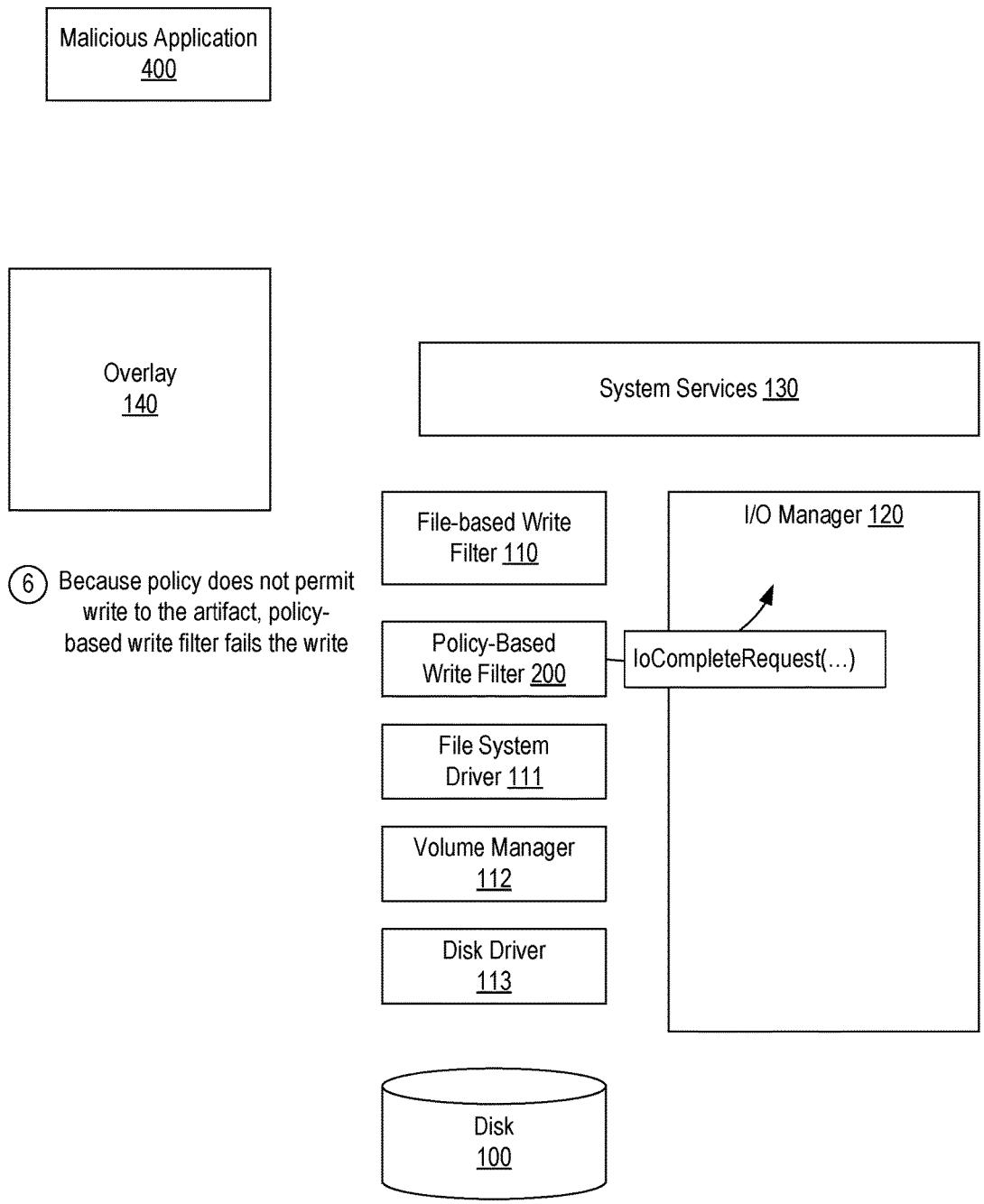

Because the IRP targets a file in folderA and because there is an exception for folderA in the exception list, file-based write filter 110 will allow the write to pass down the stack rather than redirecting the write to overlay 140 as represented in step 4 in FIG. 4D. At this point, absent the techniques of the present invention, the IRP would continue down the stack resulting in the file on disk 100 being updated. This could result in intentional or even unintentional damage to the system.

However, in accordance with embodiments of the present invention, policy-based write filter 200, which is positioned below file-based write filter 110 in the driver stack, will receive the IRP after file-based write filter 110 has decided not to redirect it. More particularly, because file-based write filter 110 did not redirect the IRP, I/O manager 120 will pass the IRP to policy-based write filter 200. In step 5 shown in FIG. 4E, policy-based write filter 200 can evaluate the IRP against policies 203 to determine whether to block the IRP or to allow it to continue down the stack.

As was mentioned above, policies 203 can identify which users can employ which applications to modify a particular artifact. Therefore, policy-based write filter 200 (or I/O controller 201 within policy-based write filter 200) can examine the contents of the IRP to determine which application is the source of the IRP, which user invoked the application, and which artifact the IRP targets. With this information, policy-based write filter 200 can then determine whether any policy dictates that the IRP should be allowed to complete successfully (i.e., whether the artifact should be allowed to be updated).

In this case, policy-based write filter 200 will determine that the IRP originated with malicious application 400 and targets a file in folderA. It will be assumed that nothing in policies 203 dictates that malicious application 400 should be allowed to update a file in folderA, and therefore, policy-based write filter 200 can cause the IRP to fail as indicated in step 6 in FIG. 4F. For example, upon determining that a policy does not allow the IRP, policy-based write filter 200 can set the status of the IRP to a failure status and then call IoCompleteRequest which will cause I/O manager 120 to route the IRP with the failure status back up the stack. In this way, policy-based write filter 200 will prevent the IRP from continuing down the stack thereby preventing the targeted file on disk 100 from being updated (or created).

Any suitable technique for determining the application that is the source of an IRP or the user that invoked the source application can be employed. For example, policy-based write filter 200 could employ the PsGetCurrentProcessID function to obtain the ProcessID associated with an IRP and then use the ProcessID as an input to the ZwQueryInformationProcess function to retrieve information about the source application, and could use the GetUserName function to obtain the username of the current user. The artifact to which the IRP is directed can also be determined in any suitable manner such as by examining the FileName member in the FILE_OBJECT structure contained in the IRP.

With this information, policy-based write filter 200 can examine policies 203 for any matching policy/setting that would allow the IRP to complete successfully. Alternatively, policies 203 could instead be structured to define which IRPs should be blocked (i.e., policies 203 could be structured as either a whitelist or a blacklist). Given that policy-based write filter 200 may typically allow relatively few artifacts to be updated, it may be preferable to structure policies 203 as a whitelist. In any case, a policy may comprise an identification of one or more users and/or one or more applications that should or should not be allowed to access a particular artifact. As such, policy-based write filter 200 can be configured to obtain the necessary information for each IRP that it is passed to enable it to determine whether any policy settings in policies 203 apply to the IRP.

Figure 5A:
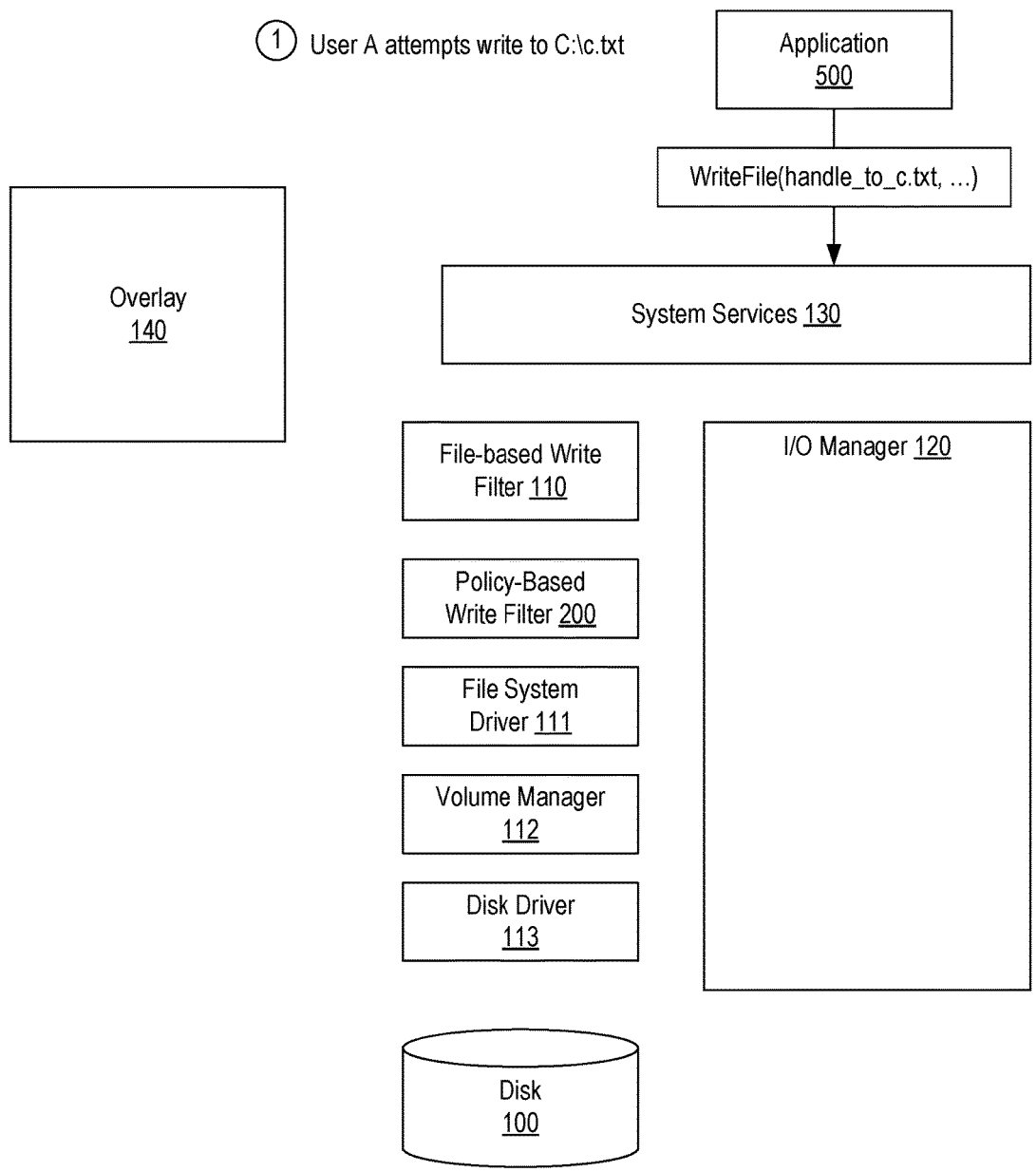
FIGS. 5A-5D illustrate how the policy-based write filter can allow modification of an artifact on a protected volume.
Figure 5B:
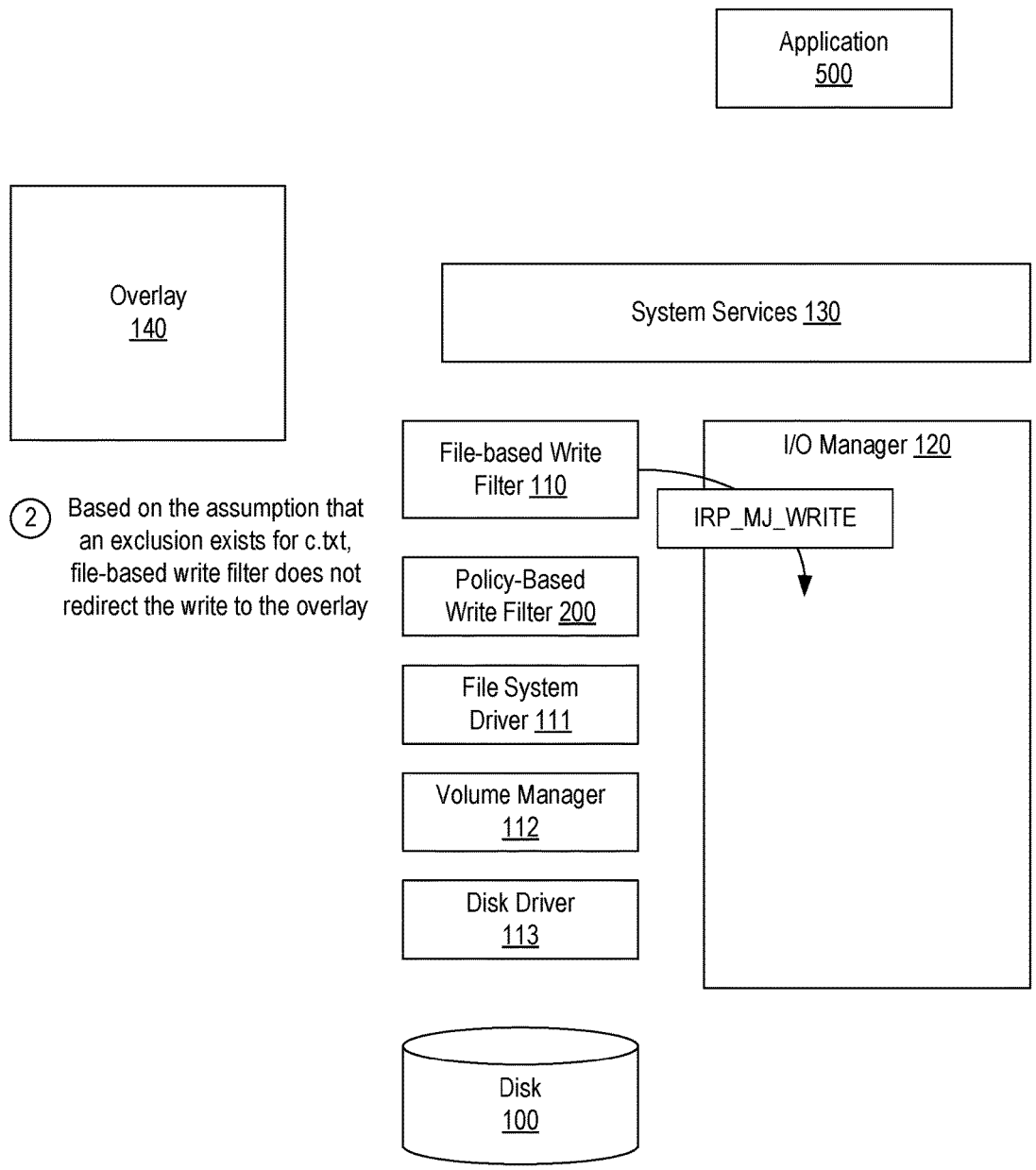

FIGS. 5A-5D provide an example of how policy-based write filter 200 can allow an artifact to be updated. In FIG. 5A, it is assumed that user A has opened and modified the file C:\c.txt in application 500 and has requested that the modified file be saved. For this example, it will also be assumed that an exclusion for c.txt exists in the exclusion list for file-based write filter 110 and that policies 203 is structured as shown in FIG. 3. In response to the request to save the modified file, application 500 will call WriteFile( ) with a handle to c.txt in step 1 shown in FIG. 5A. As a result, an IRP will be created for this write and passed to file-based write filter 110. Based on the assumption that an applicable exclusion exists, file-based write filter 110 will not redirect the write to overlay 140 but instead will allow the IRP to continue down the stack as represented in step 2 in FIG. 5B.

Figure 5C:
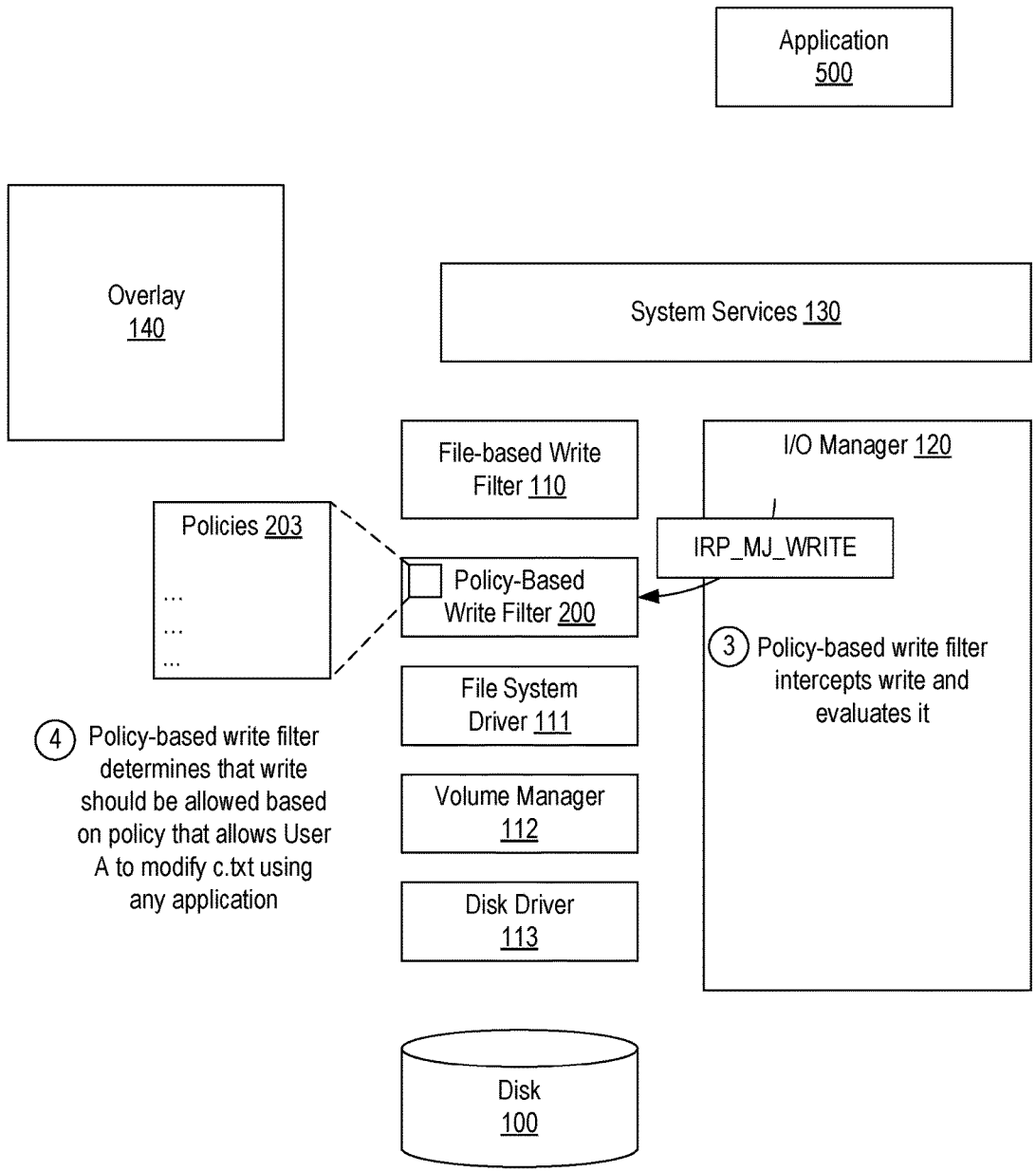
Figure 5D:
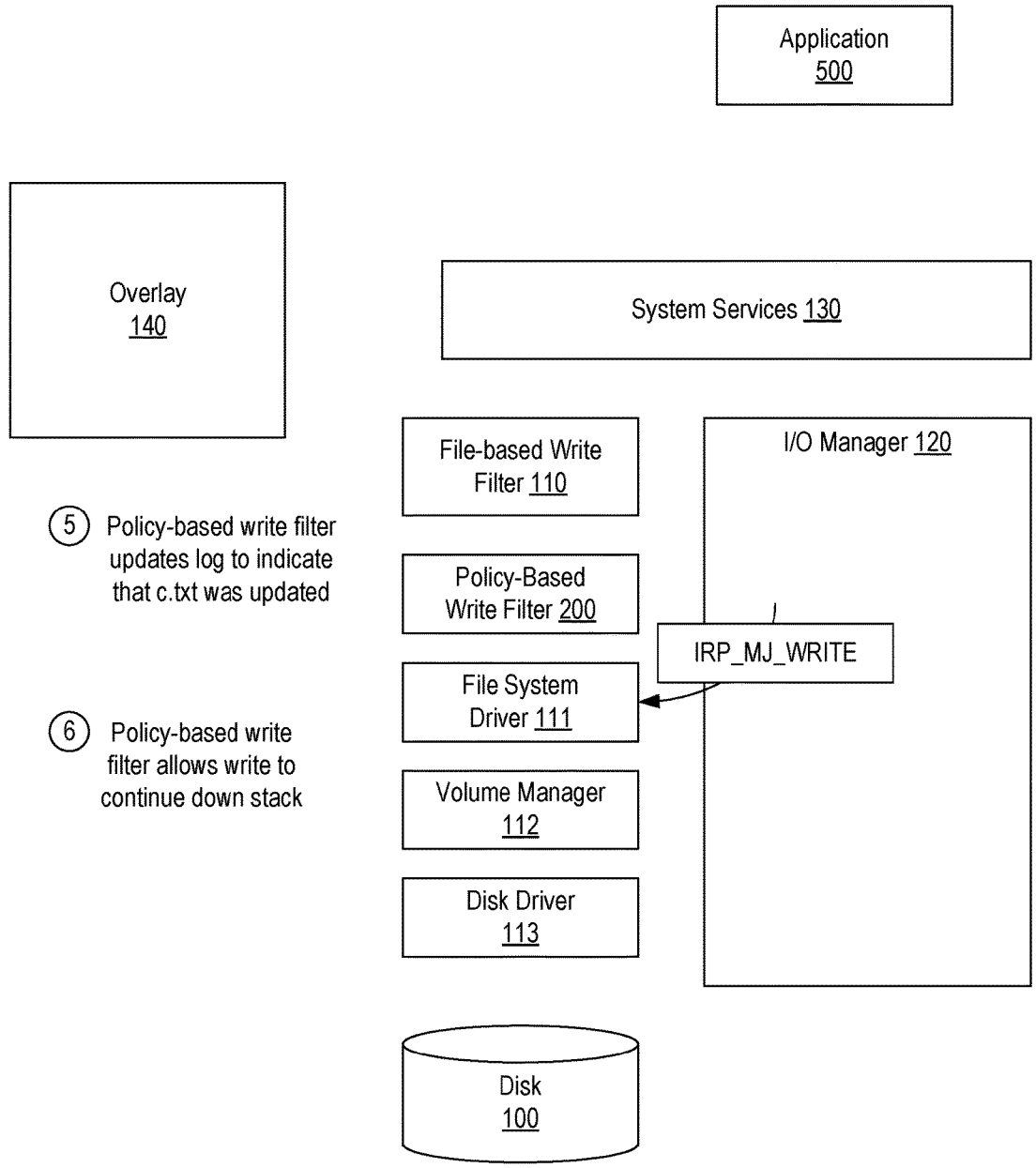

Next, I/O manager 120 will pass the IRP to policy-based write filter 200 as represented by step 3 in FIG. 5C. Policy-based write filter 200 will employ the proper function calls to identify the source application (application 500) and user (User A) as well as the target (C:\c.txt) of the IRP, and then use this information to determine whether the IRP should be allowed to continue down the stack or should instead be blocked. Referring to FIG. 3, policies 203 includes a rule that User A is allowed to modify C:\c.txt using any application. Accordingly, policy-based write filter 200 will determine that the IRP should be allowed as represented in step 4 in FIG. 5C. As a result, in step 5 in FIG. 5D, policy-based write filter 200 is shown as directing the IRP down the stack so that the modifications to the file will be persisted to disk 100.

Figure 6:
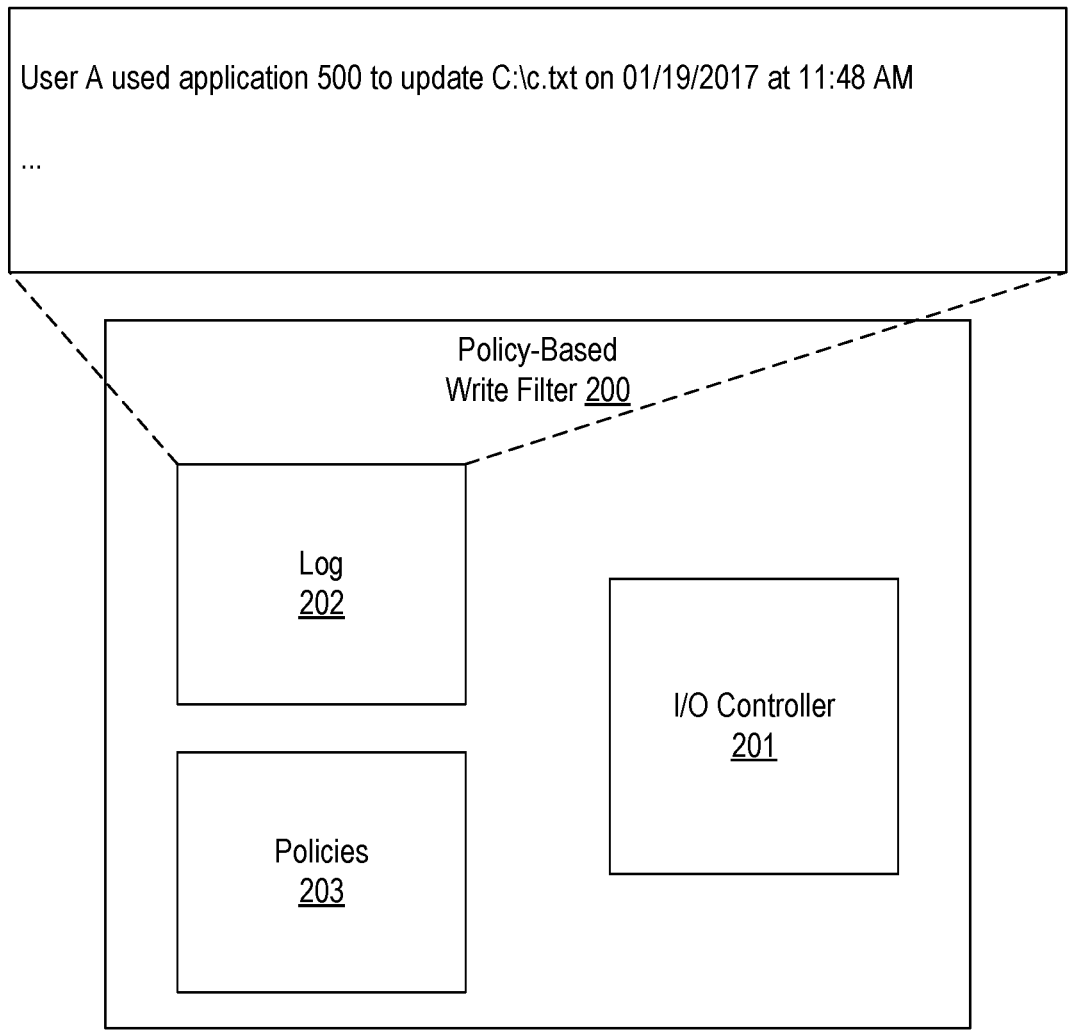
FIG. 6 illustrates an example of how the policy-based write filter can update a log when it allows an artifact on a protected volume to be modified.

Additionally, in step 6, policy-based write filter 200 is shown as updating log 202 to include an indication that the file C:\c.txt was modified by application 500. FIG. 6 provides an example of how log 202 can be structured. As shown, log 202 includes an entry of "User A used application 500 to update C:\c.txt on Jan. 19, 2017 at 11:48 AM." Entries in log 202 can be structured in any suitable way and may include more or less information that in shown in FIG. 6. If, at a later time, it is determined that some harm has occurred to disk 100, log 202 can be employed to identify the possible source of the harm.

Although not shown, in some embodiments, policy-based write filter 200 can update log 202 when any IRP is blocked. By logging blocked requests, policy-based write filter 200 can facilitate identifying malicious applications (e.g., by identifying the source of a number of blocked requests) as well as identifying legitimate applications whose requests are being improperly blocked.

FIG. 7 provides a flowchart of an example method 700 for preventing an artifact on a protected volume from being modified. Method 700 can be performed by policy-based write filter 200.

Method 700 includes an act 701 of loading a policy-based write filter in a device stack corresponding to a protected volume, the policy-based write filter being loaded below a file-based write filter, the policy-based write filter being associated with policies that define whether artifacts on the protected volume should be allowed to be modified. For example, policy-based write filter 200, which includes policies 203, can be loaded below file-based write filter 110 in the device stack for disk 100.

Method 700 includes an act 702 of receiving, at the policy-based write filter, a first request to modify a first artifact on the protected volume. For example, policy-based write filter 200 can receive a request to modify a file stored on disk 100.

Method 700 includes an act 703 of evaluating the first request against the policies to determine that the policies do not permit the first artifact to be modified by the first request. For example, policy-based writer filter 200 can determine that policies 203 do not include a rule that would allow malicious application 400 to modify a file in folderA.

Method 700 includes an act 704 of preventing the first request from modifying the first artifact. For example, policy-based write filter 200 can fail the request by completing an IRP with a failure status.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for preventing an artifact on a protected volume from being modified, the method comprising:
    loading a policy-based write filter in a device stack corresponding to a protected volume, the policy-based write filter being loaded below a file-based write filter, the policy-based write filter being associated with policies that define whether artifacts on the protected volume should be allowed to be modified;
    receiving, at the policy-based write filter, a first request to modify a first artifact on the protected volume, the policy-based write filter receiving the first request after the file-based write filter has allowed the first request;
    evaluating the first request against the policies to determine that the policies do not permit the first artifact to be modified by the first request; and
    preventing the first request from modifying the first artifact even though the file-based write filter allowed the first request.

2. The method of claim 1, wherein the file-based write filter is the File-Based Write Filter of the Windows Embedded operating system.

3. The method of claim 1, wherein the policies define which applications can modify a particular artifact.

4. The method of claim 1, wherein the policies define which users can modify a particular artifact.

5. The method of claim 1, wherein the policies define which users can use which applications to modify a particular artifact.

6. The method of claim 1, wherein the file-based write filter is configured to selectively redirect requests to modify artifacts of the protected volume to an overlay.

7. The method of claim 1, wherein determining that the policies do not permit the first artifact to be modified by the first request comprises one of:
    determining that a source of the first request is a first application and the policies do not allow the first application to be used to modify the first artifact;
    determining that the first request is associated with a first user and the policies do not allow the first user to modify the first artifact; and
    determining that a source of the first request is a first application that is executed by a first user and the policies do not allow the first user to employ the first application to modify the first artifact.

8. The method of claim 1, wherein determining that the policies do not permit the first artifact to be modified by the first request comprises one of:
    determining that a source of the first request is a first application and the policies do not allow the first application to be used to modify the first artifact;
    determining that the first request is associated with a first user and the policies do not allow the first user to modify the first artifact; or
    determining that a source of the first request is a first application that is executed by a first user and the policies do not allow the first user to employ the first application to modify the first artifact.

9. The method of claim 1, further comprising:
    adding an entry to a log that indicates that the first request was prevented from modifying the first artifact.

10. The method of claim 1, wherein the first request comprises an input/output request packet (IRP) and wherein preventing the first request from modifying the first artifact comprises completing the IRP with a failure status.

11. The method of claim 1, further comprising:
    receiving, at the policy-based write filter, a second request to modify a second artifact on the protected volume;
    evaluating the second request against the policies to determine that the policies permit the second artifact to be modified by the second request; and
    allowing the second request to complete.

12. The method of claim 11, further comprising:
    adding an entry to a log that indicates that the second request was allowed.

13. The method of claim 12, wherein the entry identifies one or both of an application or a user associated with the second request.

14. One or more computer storage media storing computer-executable instructions which when executed implement a policy-based write filter that is configured to be loaded in a device stack corresponding to a protected volume below a file-based write filter and that is further configured to perform the following:

receive requests to modify artifacts on the protected volume after the requests have been evaluated and allowed by the file-based write filter;

evaluate the requests against policies; and for each request, either block or allow the request based on the evaluation, wherein blocking the request comprises preventing the artifact to which the request is direct from being modified even though the file-based write filter approved the request.

15. The computer storage media of claim 14, wherein the policy-based write filter only allows a request to modify an artifact on the protected volume when the policies indicate that an application that is the source of the request is allowed to modify the artifact.

16. The computer storage media of claim 14, wherein the policy-based write filter only allows a request to modify an artifact on the protected volume when the policies indicate that a user that is associated with the request is allowed to modify the artifact.

17. The computer storage media of claim 14, wherein the policy-based write filter only allows a request to modify an artifact on the protected volume when the policies indicate that a user that is associated with the request is allowed to use an application that is the source of the request to modify the artifact.

18. The computer storage media of claim 14, wherein the request is an input/output request packet (IRP) and wherein blocking the request comprises completing the IRP with a failure status.

19. A method for augmenting protection of a volume comprising:

loading a policy-based write filter under a file-based write filter in a device stack pertaining to the volume; and for any input/output request packet (IRP) that represents a modification to an artifact on the volume and that the file-based write filter evaluated and did not redirect to an overlay, evaluating the IRP against policies such that when the policies indicate that the artifact is allowed to be modified, the policy-based write filter allows the IRP to be passed down the device stack, whereas, when the policies indicate that the artifact is not allowed to be modified, the policy-based write filter fails the IRP.

20. The method of claim 19, wherein the policies indicate that an artifact is allowed to be modified by identifying one or more users that are allowed to use one or more applications to modify the artifact.

* * * * *